(12) United States Patent
Jiang

(10) Patent No.: US 8,169,551 B2
(45) Date of Patent: May 1, 2012

(54) METHOD AND APPARATUS FOR ADJUSTING CENTER FREQUENCY OF FILTER

(75) Inventor: Jeng-Shiann Jiang, Tainan County (TW)

(73) Assignee: Himax Technologies Limited, Fonghua Village, Xinshi Dist., Tainan (TW)

( * ) Notice: Subject to any disclaimer, the term of this patent is extended or adjusted under 35 U.S.C. 154(b) by 1179 days.

(21) Appl. No.: 11/952,132

(22) Filed: Dec. 7, 2007

(65) Prior Publication Data
US 2009/0147147 A1 Jun. 11, 2009

(51) Int. Cl.
*H04N 5/50* (2006.01)
(52) U.S. Cl. .................... 348/735; 340/607; 340/731
(58) Field of Classification Search .......... 348/731, 348/735, 607
See application file for complete search history.

(56) References Cited

U.S. PATENT DOCUMENTS

| | | | |
|---|---|---|---|
| 4,761,825 A | 8/1988 | Ma | |
| 7,239,358 B1 * | 7/2007 | Mayer | 348/731 |
| 7,327,406 B2 * | 2/2008 | Utsunomiya et al. | 348/731 |
| 2002/0196878 A1 | 12/2002 | Dick | |
| 2003/0087622 A1 * | 5/2003 | Jayaraman et al. | 455/307 |
| 2004/0233886 A1 * | 11/2004 | Dieterich et al. | 370/348 |
| 2005/0237389 A1 * | 10/2005 | Pugel et al. | 348/164 |
| 2005/0248689 A1 * | 11/2005 | Yen et al. | 348/731 |
| 2006/0055824 A1 * | 3/2006 | Zhu et al. | 348/554 |
| 2006/0055832 A1 * | 3/2006 | Lee | 348/735 |
| 2007/0229174 A1 * | 10/2007 | Chang et al. | 331/16 |
| 2007/0268408 A1 * | 11/2007 | Kim et al. | 348/607 |
| 2008/0226001 A1 * | 9/2008 | Geng et al. | 375/350 |
| 2009/0088105 A1 * | 4/2009 | Rofougaran | 455/130 |
| 2009/0119732 A1 * | 5/2009 | Spieker et al. | 725/117 |

* cited by examiner

*Primary Examiner* — Pankaj Kumar
*Assistant Examiner* — Mulugeta Mengesha
(74) *Attorney, Agent, or Firm* — Winston Hsu; Scott Margo

(57) ABSTRACT

The present invention provides a method for adjusting a center frequency of a filter utilized for extracting information carried via a target channel. The method includes: detecting adjacent channel interference (ACI) for the target channel to generate a channel interference information; and adjusting the center frequency of the filter for the target channel according to the channel interference information.

12 Claims, 3 Drawing Sheets

METHOD AND APPARATUS FOR ADJUSTING CENTER FREQUENCY OF FILTER

BACKGROUND OF THE INVENTION

1. Field of the Invention

The present invention relates to adjusting a center frequency of a filter, and more particularly, to a method and an apparatus for adjusting a center frequency of a surface acoustic wave (SAW) filter used for extracting information carried via a television (TV) channel.

2. Description of the Prior Art

The Digital Video Broadcasting-terrestrial (DVB-T) standard has been adopted by many countries. However, the bandwidths of broadcasting signals among different regions in the world are different, and it is known that at least four bandwidths 5 MHz, 6 MHz, 7 MHz, and 8 MHz are adopted for video broadcasting at the present time. Therefore, if a product (i.e. a TV) designed for a single bandwidth is used in a region using a different bandwidth, this may result in reduced video quality or even an unwatchable video signal. There are two prior art methods for solving this problem; a first method is that a tuner uses several different SAW filters respectively having different bandwidths to receive video broadcasting signals with different bandwidths. As several SAW filters are used, however, and the SAW filter is expensive, employing several SAW filters in the tuner results in higher cost on production line management and materials. The second method is that a single SAW filter having a maximum bandwidth among signal bandwidths available for TV signal transmission is used in the tuner to guarantee that a required signal will not be filtered out. When the bandwidth of the video broadcasting signal is less than the bandwidth of this SAW filter, however, the SAW filter cannot filter out adjacent channel interference (ACI) and the video quality may be seriously influenced and degraded.

SUMMARY OF THE INVENTION

It is therefore one of the objectives of the claimed invention to provide a method and an apparatus for adjusting a center frequency of a SAW filter for extracting information carried via a TV channel, to solve the above-mentioned problems.

According to one embodiment of the claimed invention, a method for adjusting a center frequency of a filter utilized for extracting information carried via a target channel, comprises: detecting adjacent channel interference for the target channel to generate a channel interference information; and adjusting the center frequency of the filter for the target channel according to the channel interference information.

According to another embodiment of the claimed invention, an apparatus for adjusting a center frequency of a filter utilized for extracting information carried via a target channel, comprises: an ACI detector, for detecting adjacent channel interference for the target channel to generate a channel interference information; and a tuner, coupled to the ACI detector, for adjusting the center frequency of the filter for the target channel according to the channel interference information.

According to the method and the apparatus provided by the present invention, the tuner has only one SAW filter and can filter ACI by adjusting the center frequency of the SAW filter. Therefore, the production line does not need to vary due to different regions, and the cost of the management and materials can be reduced.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
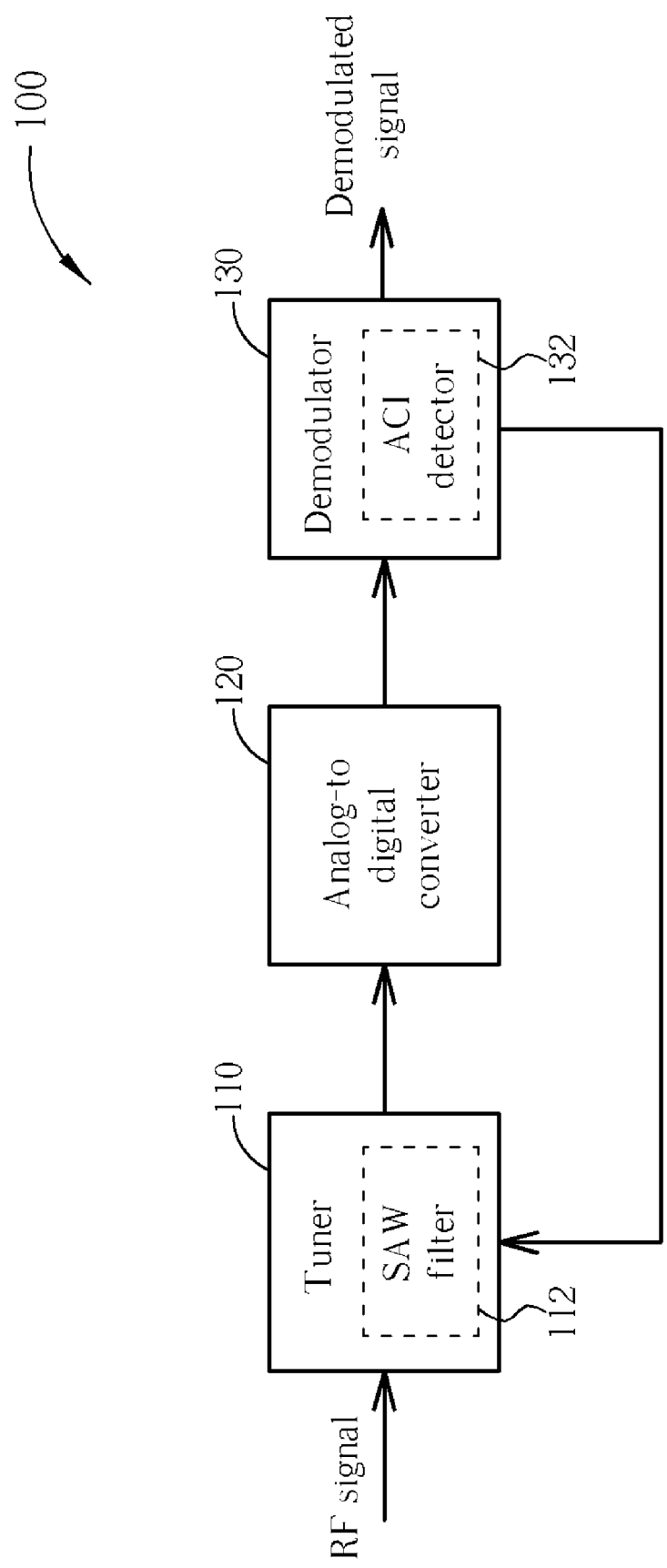
FIG. 1 is a block diagram illustrating an apparatus for adjusting a center frequency of a SAW filter utilized for extracting information carried via a TV channel according to an exemplary embodiment of the present invention.

Please refer to FIG. 1. FIG. 1 illustrates an apparatus 100 for adjusting a center frequency of a SAW filter utilized for extracting information carried via a TV channel. As shown in FIG. 1, the apparatus 100 includes a tuner 110, an analog-to-digital converter 120, and a demodulator 130. The tuner 110, coupled to the analog-to-digital converter 120, further includes a SAW filter having a maximum bandwidth among signal bandwidths available for TV signal transmission. The demodulator 130, coupled to the analog-to-digital converter 120 and the tuner 110, further includes an ACI detector 132.

As shown in FIG. 1, the tuner 110 is used to receive a radio frequency (RF) signal (i.e. the video broadcasting signal) to generate an intermediate signal (IF), and the SAW filter 112 included in the tuner 110 is used to filter the IF signal to generate a filtered signal, where the filtered signal here serves as a video signal for a TV channel. Next, the analog-to-digital converter 120 receives the filtered signal to generate a digital video signal. Then the ACI detector 132 detects the ACI of the digital video signal and categorizes the ACI of the TV channel into a lower-band ACI or an upper-band ACI to generate channel interference information. Finally, the demodulator 130 communicates with the tuner 110 to adjust the bandwidth center of the SAW filter for the TV channel according to the channel interference information generated from the ACI detector 132 and output a demodulated signal.

It is noted that, in the embodiment of the present invention, the ACI detector 132 is included in the demodulator 130 and the channel interference information is transmitted from the demodulator 130 to the tuner 110. The ACI detector 132, however, does not need to be set in the demodulator 130, and the channel interference information can also be transmitted to the tuner 110 from other devices. As long as the tuner 110 can receive the channel interference information generated from the ACI detector 132, these alternative designs are all within the scope of the present invention.

In this embodiment, the known bandwidths of the video broadcasting signal are 5 MHz, 6 MHz, 7 MHz, and 8 MHz. The SAW filter with 8 MHz bandwidth is adopted as the SAW filter 112 for further description hereinafter.

Figure 2:
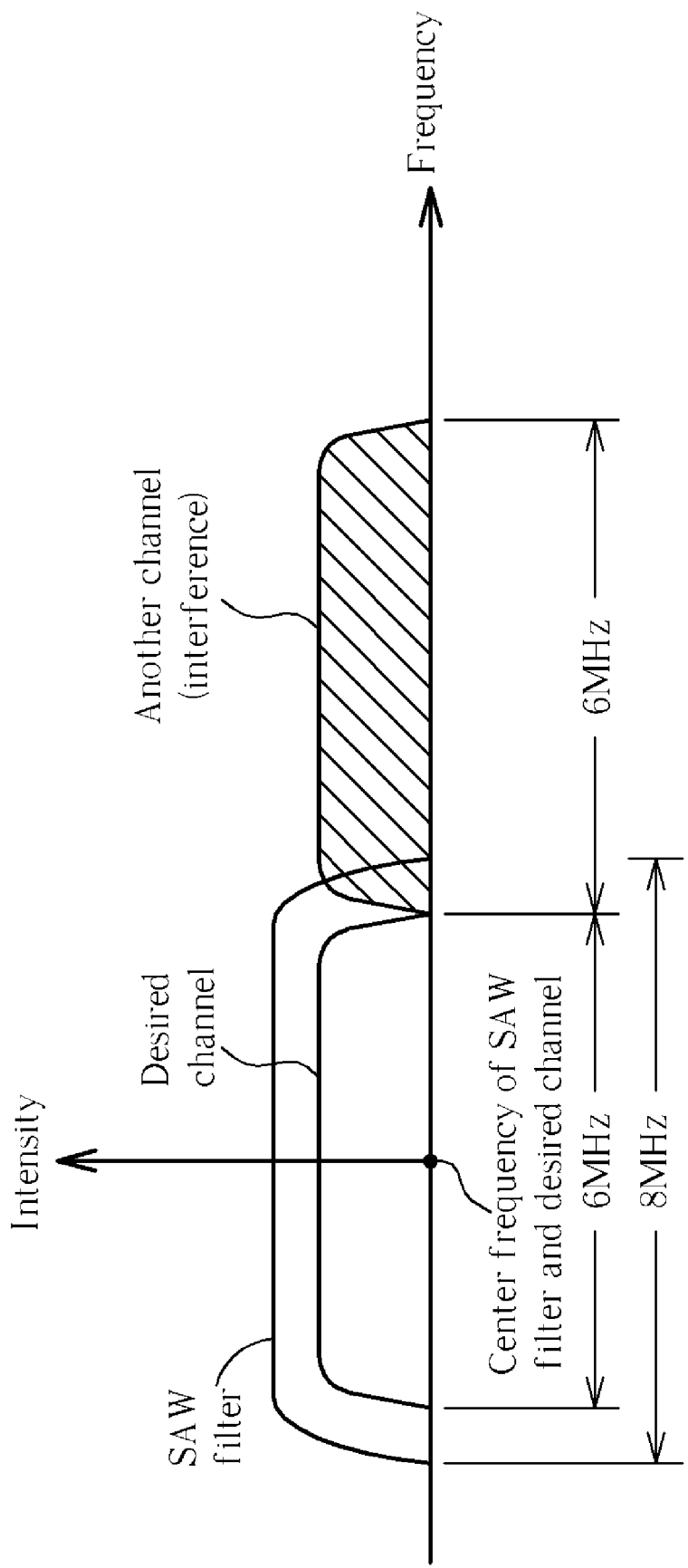
FIG. 2 is a diagram illustrating that the bandwidth of the SAW filter is greater than the bandwidth of the TV channel.

In the apparatus 100, assuming that the bandwidth of the TV channel is 6 MHz, the filtered signal may include the ACI shown in FIG. 2. FIG. 2 is a diagram illustrating that the bandwidth of the SAW filter 112 is greater than the bandwidth of the TV channel. As shown in FIG. 2, because the bandwidth of the SAW filter 112 is greater than the bandwidth of the TV channel, the filtered signal includes not only the desired signal of the TV channel, but also includes a signal of another TV channel, where the signal of the other TV channel is regarded as the interference for the desired signal. In general, this interference is the ACI and degrades the video quality of TV programs carried via the desired signal.

For eliminating the ACI, the center frequency of the SAW filter 112 is adjusted to filter out the ACI. Before adjusting the center frequency of the SAW filter, the ACI of the TV channel needs to be categorized into either the upper-band ACI or the lower-band ACI by comparing a degree of upper-band components in the ACI with a degree of lower-band components in the ACI. The degree of the upper-band components or the lower-band components can be simply obtained by measuring the intensity in the bandwidths of the upper-band or the lower-band. When the degree of upper-band components in the ACI is greater than the degree of lower-band components in the ACI, the ACI is categorized into upper-band ACI. On the contrary, when the degree of upper-band components in the ACI is not greater than the degree of lower-band components in the ACI, the ACI is categorized into lower-band ACI.

Generally, when the TV is powered on, channel auto-scan is performed to detect if a TV program exists in each channel. The ACI detection can also be performed during a channel auto-scan period to generate the channel interference information, and the channel interference information includes whether the channel has ACI or not, and the ACI categorization result (whether the ACI belongs to the upper-band ACI or the lower-band ACI).

Figure 3:
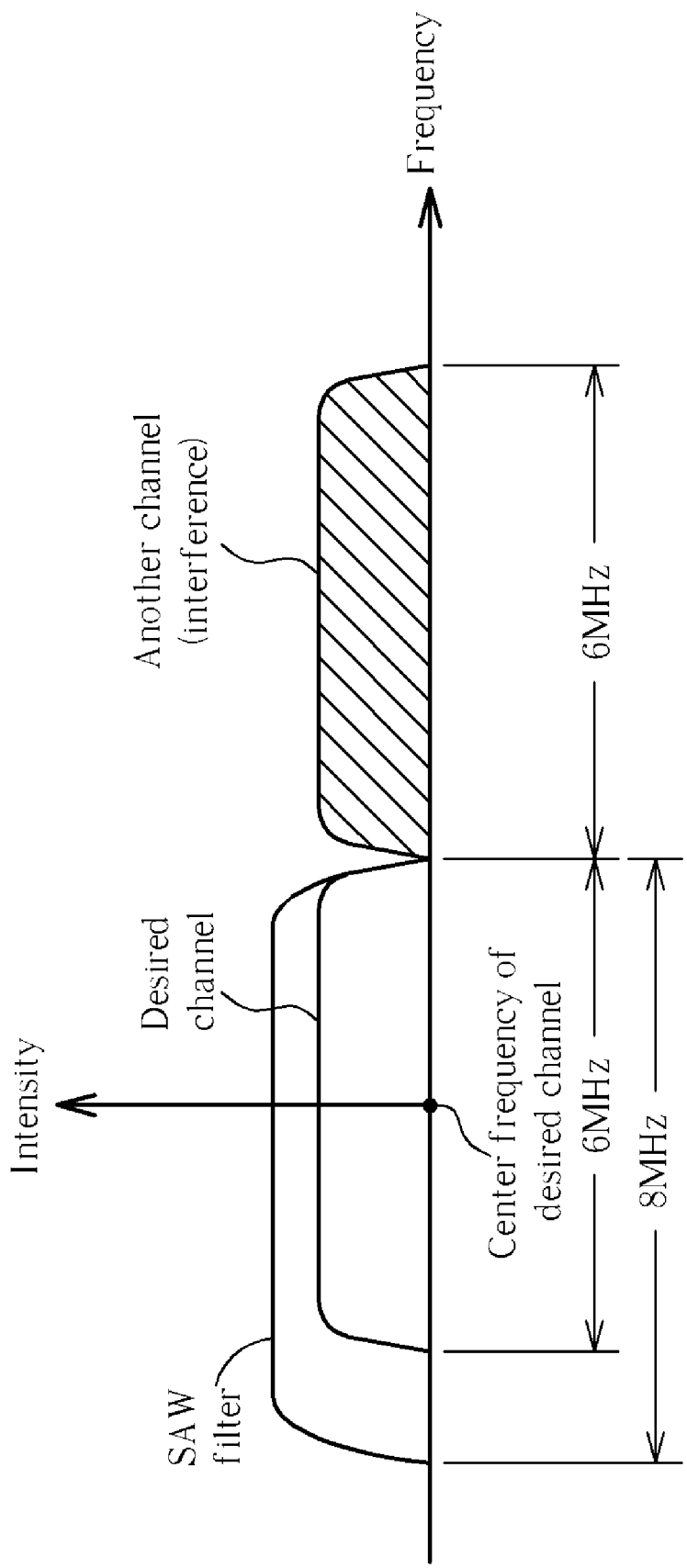
FIG. 3 is a diagram illustrating shifting the center frequency of the SAW filter shown in FIG. 2.

After categorizing the ACI, the demodulator 130 communicates with the tuner 110 through a serial control bus to adjust the center frequency of the SAW filter 112. The demodulator 130 transmits the channel interference information to the tuner 110, and the tuner 110 adjusts the SAW filter 112 according to the channel interference information. Assuming that the bandwidth of the TV channel is represented by B, when the categorization result indicates that the ACI of the target channel is the upper-band ACI, the tuner 110 shifts the center frequency of the SAW filter to a lower frequency with a shifting amount equal to (8−B)/2; in other words, the shifting amount is equal to an overlapped bandwidth of the upper-band ACI within the bandwidth of the SAW filter 112. When the categorization result indicates that the ACI of the target channel is the lower-band ACI, the tuner 110 shifts the center frequency of the SAW filter 112 to a higher frequency with a shifting amount equal to (8−B)/2; in other words, the shifting amount is equal to an overlapped bandwidth of the lower-band ACI within the bandwidth of the SAW filter 112. FIG. 3 is a diagram illustrating shifting the center frequency of the SAW filter shown in FIG. 2. As shown in FIG. 3, the tuner shifts the center frequency of the SAW filter to a lower frequency with 1 MHz, and the SAW filter can filter out the ACI as desired. Therefore, the video quality can be improved greatly by filtering out the ACI using the aforementioned center frequency shifting technique.

It is noted that measuring the intensity of the bandwidth of the lower-band and the upper-band of the SAW filter 112 is merely one of the methods for categorizing the ACI. Without departing from the spirit of the present invention, other methods for detecting the ACI and categorizing the ACI into upper-band ACI or lower-band ACI can be utilized and are all within the scope of the present invention.

It is noted that, in the embodiment of the present invention, the demodulator 130 communicates with the tuner 110 through a serial control bus. However, the demodulator 130 can also communicate with the tuner 110 through firmware or other devices. In addition, the channel interference information may not only include the ACI categorization result, but also the adjusted center frequency or the shifting amount of the center frequency of the SAW filter. These alternative designs are all within the scope of the present invention.

In addition, if the apparatus 100 is designed in a DVB-T mobile receiver, the ACI may vary according to the movement of the mobile receiver. Therefore, the ACI detector can be designed to detect and categorize the ACI periodically, i.e. dynamically. If the generated channel interference information varies, the tuner 110 adjusts the center frequency of the SAW filter 112 according to the latest channel interference information.

Briefly summarized, the present invention proposes a method for adjusting the center frequency of the SAW filter. First, the ACI detector detects and categorizes the ACI to generate the channel interference information. Next, the tuner can adjust the center frequency of the SAW filter according to the channel interference information. Finally, to support the application of a mobile receiver, the ACI detection can be performed periodically to achieve optimum signal quality.

Those skilled in the art will readily observe that numerous modifications and alterations of the device and method may be made while retaining the teachings of the invention.

What is claimed is:

1. A method for adjusting a center frequency of a filter utilized for extracting information carried via a target channel, comprising:

detecting adjacent channel interference (ACI) for the target channel to generate a channel interference information; and adjusting the center frequency of the filter for the target channel according to the channel interference information;

wherein the step of detecting ACI for the target channel to generate the channel interference information comprises:

comparing a degree of upper-band components in the ACI with a degree of lower-band components in the ACI to generate a comparison result;

categorizing the ACI of the target channel into an upper-band ACI when the comparison result indicates that the degree of upper-band components in the ACI is greater than the degree of lower-band components in the ACI; and categorizing the ACI of the target channel into an lower-band ACI when the comparison result indicates the degree of upper-band components in the ACI is not greater than the degree of lower-band components in the ACI; and the step of adjusting the center frequency of the filter for the target channel according to the channel interference information comprises:

when the ACI of the target channel is categorized to be the upper-band ACI, shifting the center frequency of the filter to a lower frequency; and when the ACI of the target channel is categorized to be the lower-band ACI, shifting the center frequency of the filter to a higher frequency.

2. The method of claim 1, wherein the filter is a surface acoustic wave (SAW) filter.

3. The method of claim 1, wherein the target channel is a TV channel.

4. The method of claim 3, further comprising:
setting the filter to have a maximum bandwidth among a plurality of signal bandwidths available for TV signal transmission.

5. The method of claim 1, wherein a shifting amount of the center frequency of the filter is equal to an overlapped bandwidth of the upper-band ACI or the lower-band ACI within a bandwidth of the filter.

6. The method of claim 1, wherein detecting ACI for the target channel is performed periodically.

7. An apparatus for adjusting a center frequency of a filter utilized for extracting information carried via a target channel, comprising:
an ACI detector, for detecting adjacent channel interference (ACI) for the target channel to generate a channel interference information; and
a tuner, coupled to the ACI detector, for adjusting the center frequency of the filter for the target channel according to the channel interference information;
wherein the ACI detector compares a degree of upper-band components in the ACI with a degree of lower-band components in the ACI to generate a comparison result, categorizes the ACI of the target channel into an upper-band ACI when the comparison result indicates that the degree of upper-band components in the ACI is greater than the degree of lower-band components in the ACI, and categorizes the ACI of the target channel into an lower-band ACI when the comparison result indicates the degree of upper-band components in the ACI is not greater than the degree of lower-band components in the ACI; when the ACI of the target channel is categorized to be the upper-band ACI, the tuner shifts the center frequency of the filter to a lower frequency; and when the ACI of the target channel is categorized to be the lower-band ACI, the tuner shifts the center frequency of the filter to a higher frequency.

8. The apparatus of claim 7, wherein the filter is a surface acoustic wave (SAW) filter.

9. The apparatus of claim 7, wherein the target channel is a TV channel.

10. The apparatus of claim 9, wherein the filter has a maximum bandwidth among a plurality of signal bandwidths available for TV signal transmission.

11. The apparatus of claim 7, wherein a shifting amount of the center frequency of the filter is equal to an overlapped bandwidth of the upper-band ACI or the lower-band ACI within a bandwidth of the filter.

12. The apparatus of claim 7, wherein the ACI detector performs ACI detection for the target channel periodically.

* * * * *